Feb. 14, 1933.  C. W. LA PIERRE  1,897,850
MEASURING INSTRUMENT
Filed Aug. 27, 1931  2 Sheets-Sheet 1
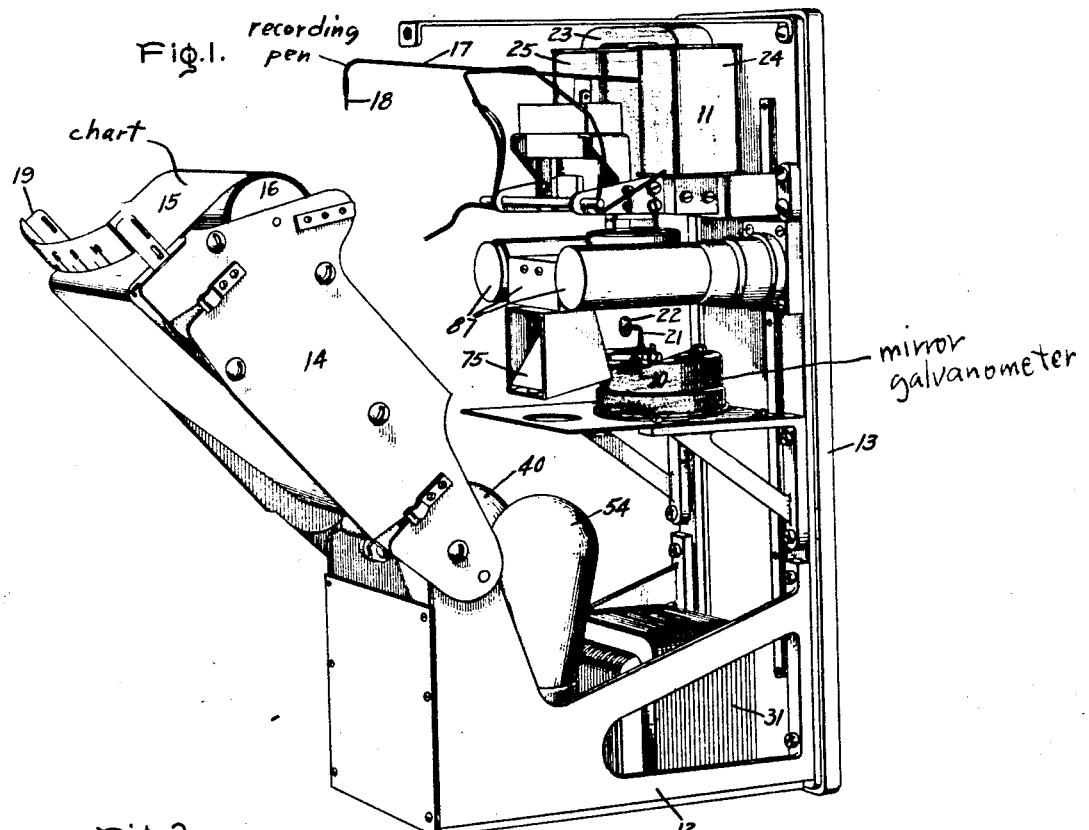
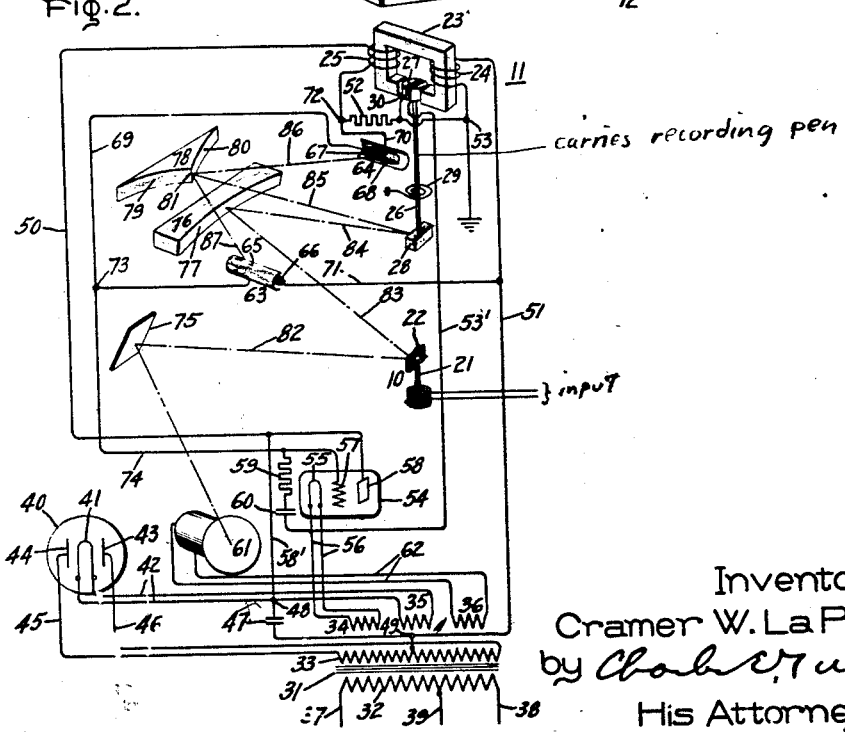
Inventor:
Cramer W. La Pierre,
by Charles Mullan
His Attorney.

Feb. 14, 1933.  C. W. LA PIERRE  1,897,850
MEASURING INSTRUMENT
Filed Aug. 27, 1931   2 Sheets-Sheet 2

Inventor:
Cramer W. La Pierre,
by Charles E. Tullar
His Attorney.

Patented Feb. 14, 1933

1,897,850

UNITED STATES PATENT OFFICE

CRAMER W. LA PIERRE, OF SCHENECTADY, NEW YORK, ASSIGNOR TO GENERAL ELECTRIC COMPANY, A CORPORATION OF NEW YORK

MEASURING INSTRUMENT

Application filed August 27, 1931. Serial No. 559,741.

My invention relates to measuring instruments and in particular to indicating, recording, relaying, telemetering, and similar devices in which deflections of a highly sensitive element are reproduced by an element having sufficient torque to operate devices requiring greater torque than that obtainable from highly sensitive deflecting elements. More specifically my invention relates to measuring instruments in which an optical follow-up system is used to enable the sensitive element to control the other element without being mechanically loaded.

The principal object of my invention is to provide means for reproducing the deflection of the measuring element which responds rapidly with high accuracy and will maintain its accuracy for a long period of time.

Another object of my invention is to provide a measuring device which will be independent of voltage variations in an auxiliary circuit. A further object is to provide an optical follow-up system which will be independent of variations in the intensity of the light source and in the relative sensitivity of the photo-electric tubes and in which a total loss of the sensitivity of either tube will be readily detected. Still another object of my invention is to provide a measuring instrument in which the torque producing element is energized by means of current released by a three electrode vacuum tube and which will be independent of variations in the characteristics of such tube.

An additional object of my invention is to provide a measuring instrument having a torque producing element which may be made responsive to any type of controlling element.

My invention also has for its object the provision of a compact highly sensitive quickly responding recording instrument providing a continuous record and which may be produced in portable form. A further object of my invention is to increase the compactness of the measuring instrument by utilizing its field coils to filter and smooth out the rectified current supplied to operate the torque producing element.

Figure 3:
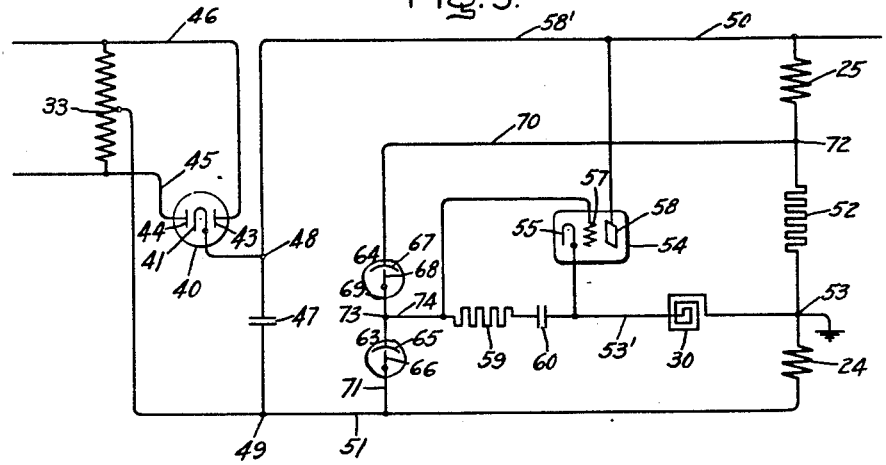
Figure 4:
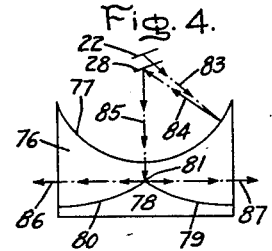
Figure 5:
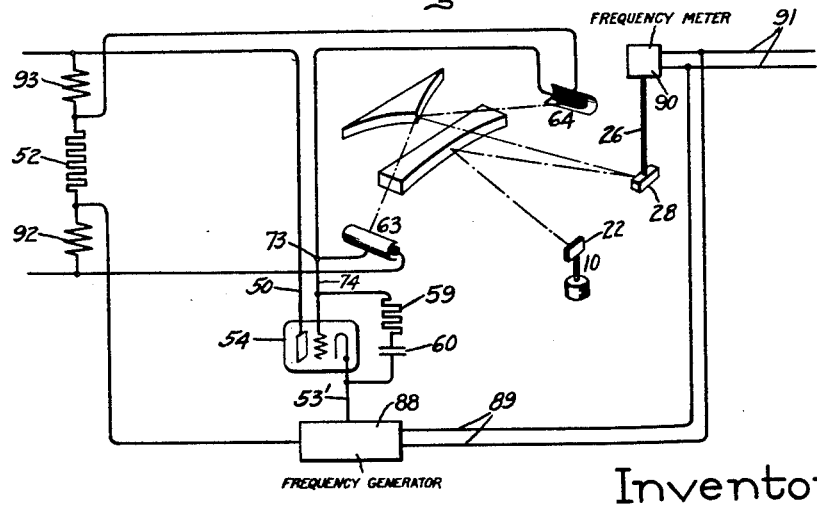

To afford a better understanding of my invention, reference is made in the following description to the accompanying drawings in which Fig. 1 represents one embodiment of my invention taking the form of a recording instrument shown with the chart carriage tilted forward and its cover removed; Fig. 2 is a diagram of connections of this embodiment of my invention; Fig. 3 is a schematic diagram illustrating the principle of operation of my invention; Fig. 4 is a schematic diagram of the optical paths of the follow-up device utilized in the embodiment shown in Fig. 2, and Fig. 5 illustrates a modification in the circuit of Fig. 2, which may be used in telemetering.

In accordance with my invention I provide a basic or controlling element and a secondary or torque producing element. The control element is made directly responsive to the quantity to be measured and the torque producing element is energized by an auxiliary source of power. A follow-up system of the optical type or any type dependent upon the deflection beams of radiant energy is utilized to provide a means of control between the basic element and the torque producing element without placing any mechanical load upon the basic or control element. The optical system is so arranged that when the two elements are in accord, the light illuminating a pair of photo-electric tubes will be so divided that the circuit will be balanced with the auxiliary source of current supplying the amount of current necessary to produce the proper deflections of the torque producing element. The features of my invention which I believe to be novel and patentable are pointed out in the claims appended hereto.

Referring now more in detail to the drawings in which like reference characteristics refer to like parts throughout, I provide the basic or controlling element 10 which may be a sensitive electric measuring instrument and the secondary or torque producing element 11. These elements are shown in connection with a recording instrument 12 but it will be understood that my invention is not limited to recording instruments but includes the use of a highly sensitive element to control a high torque element or a secondary element in other devices as well.

In the recording instrument 12 a vertical portion 13 is provided to support the various parts. The recording mechanism may be of any standard construction well known in the art including the chart carriage 14, here shown, tilted forward containing the record strip 15 carried by rolls, one of which (16) is shown in the drawings. The recording mechanism also includes the pointer 17 provided with a siphon pen 18 cooperating with the record sheet 15 and the scale 19 in accordance with a well known construction which forms no part of my invention. The record rolls carrying the strip 15 may be driven in any suitable manner such as a clock-work or an electric motor.

The controlling element 10 the details of construction of which form no part of my invention may be of any type in which a rotary deflection is produced in a movable member. By means of an extension 21 or any other suitable manner a mirror 22 is attached to the deflecting member of the element 10.

The torque producing element 11 may be of any type which may be made responsive to electric current controlled by a vacuum discharge device. In its preferred form the torque producing element 11 comprises a stationary field member having a magnetic core 23 wound with coils 24 and 25 and a rotatable element having a vertical shaft 26 carrying an armature 27 and a mirror 28. But it will be understood that a permanent magnet or other suitable field producing means may also be used. The rotatable element is biased to a position below its scale range by means of a spring 29 so as to act as a suppressed zero device. The armature 27 carries a coil 30 energized by direct current supplied by an auxiliary source.

The power to operate the torque producing element and the auxiliary devices used in connection therewith is supplied by means of a transformer 31 having a primary winding 32 and secondary windings 33, 34, 35, and 36. The primary winding 32 is connected to an alternating current circuit by means of leads 37 and 38. An additional lead 39 connected to a tap of the primary 32 is provided to adapt the transformer to an alternating current circuit having a voltage different from standard in order to insure maximum life of the filaments of the devices used with the measuring instrument. But it will be understood that the operation of my device is not dependent upon the constancy of the voltage of the supply circuit.

In order to obtain a direct current I provide a rectifier 40 of the vacuum tube type having a cathode 41, preferably thermionic, of the filament type connected to the secondary winding 35 of transformer 31 by means of leads 42. The rectifier tube 40 is also provided with anodes 43 and 44 connected to the extremities of secondary winding 33 by means of leads 45 and 46. To assist in smoothing out the rectifier current I may provide a condenser 47 connected across the points 48 and 49 of the rectified direct current system which are at positive and negative potentials respectively.

To obtain a compact instrument the direct current is taken from the points 48 and 49 by means of leads 50 and 51 to a circuit consisting of field coils 24 and 25, and a resistor 52 in series therewith which serves both as a filter for the rectified current and as a voltage divider for supplying the required voltages to the auxiliary devices used in connection with the instrument. However, I may also provide a filter or a voltage divider separate from field coils 24 and 25. This circuit is grounded at the point 53 which forms a common terminal of the resistor 52 and the field coil 24 of the torque producing element 11.

To control the current flowing in the movable coil 30 of the element 11, a three electrode evacuated discharge device 54 is provided having a filamentary cathode 55 supplied with current from secondary winding 34 of the transformer 31 by means of leads 56. The tube 54 is also provided with a grid 57, the potential of which controls the discharge of the tube and an anode 58 which is connected to the positive terminal of the rectified direct current source by means of lead 58'. A grid resistance 59 and a grid condenser 60 in series therewith are connected between the grid 57 and the cathode 55 to control the rapidity of response of the torque producing element.

In order that the controlling element 10 and the torque producing element 11 may be operatively connected by a weightless medium to prevent loading controlling element 10, I provide a source of radiant energy 61 which may take the form of an incandescent lamp energized by secondary winding 36 of transformer 31 through leads 62. Although I prefer to use an incandescent lamp it will be understood that other sources of light or other sources of radiant energy such as radio active materials or devices emitting heat or other electro-magnetic rays may also be employed.

The tube 54 is controlled, in a manner to be explained hereinafter by the relative illumination of photo-electric tubes 63 and 64, having electrodes 65, 66, 67, and 68. Preferably, the photo-electric tubes 63 and 64 are of the two electrode vacuum or saturated type in which the current is independent of voltage above a certain point referred to as the saturation point in the current voltage curve. The anode 68 of photo-electric tube 64 is joined to cathode 65 of photo-electric tube 63 by means of a lead 69.

The photo-electric tubes 63 and 64 in series are connected to the negative side of the direct current line by means of lead 71, and by means of lead 70 to a point 72 which is the common terminal of the field coil 25 and the resistor 52, and therefore at an intermediate potential with respect to the negative and positive sides of the direct current line. The common terminal 73 of the photo-electric tubes 63 and 64 is connected by means of lead 74 to the grid 57 of the three-electrode vacuum tube 54.

A mirror 75 is provided to direct a beam of light from the source 61 toward the mirror 22 of controlling element 10. A mirror 76 having a surface 77 forming a segment of a spherical surface is provided to reflect a beam of light toward the mirror 28 carried by the torque producing element 11, and a mirror 78 having concave surfaces 79 and 80 intersecting in the edge 81 is provided to divide the light reflected from mirror 28 between the photo-electric cells 63 and 64. It will be understood that suitable means such as condensing and focusing lenses or the employment of focusing mirrors for one or more of the mirrors 22, 28, or 75 may be employed to obtain a narrow beam of light from the lamp 61 and to obtain a sharp focusing of the filament of said lamp upon the edge 81 of the reflector 78. It will also be understood that the curvature of the surface 77 will be so chosen as to obtain the proper optical relationship between the parts of the optical system.

The principle of operation of my device may be somewhat better understood by reference to Fig. 3 which illustrates more clearly the voltage relationships between the various portions of the circuit. It will be seen that the field coil 24, registor 52, and field coil 25 constitute a voltage divider connected across the positive and negative leads 50 and 51 of the direct-current system. Intermediate potentials are obtainable from the points 53 and 72. The movable coil 30 of the torque producing element 11 is connected in the plate circuit of the tube 54 between the grounded point 53 forming the negative side of the plate potential and the cathode 55 to which it is connected by lead 53 so that the deflection of the torque producing element depends upon the output of tube 54. The output of tube 54 in turn is controlled by the potential of grid 57. This potential is determined by the charge held by condenser 60 and remains constant as long as no current flows in the lead 74, joining the common terminal 73 of the photo-electric tubes 63 and 64 to the grid 57 and the grid condenser 60. When the light falling upon the photo-electric tubes 63 and 64 is equally divided the current flowing in these tubes will be equal, no current will flow in lead 74, and consequently grid 57 will remain at the potential required to permit the tube 54 to pass a quantity of current in its plate circuit through the coil 30 just sufficient to maintain the deflection of the torque producing element 11 constant. If the deflection of the controlling element 22 changes or if for some other reason the agreement between the deflecting elements 22 and 28 ceases a greater quantity of light will fall upon one photo-electric tube than upon the other so that the currents in the photo-electric tubes 63 and 64 will be unbalanced and current will flow in lead 74 to charge or discharge condensor 60, varying the potential of the grid 57 so as to modify the output of the tube 54 until the deflections of elements 10 and 11 are brought into accord and the photo-electric tubes are again balanced.

The magnitudes of the grid resistance 59 and the condenser 60 determines the rapidity with which the variations in the potential of grid 57 follow the flow of current in lead 74, and the variations in the charge of condenser 60 so that the damping of the torque producing element 11 may be controlled by varying the magnitudes of 59 and 60.

Since the same source produces the light shining upon photo-electric tubes 63 and 64 and since the operation depends upon the balance in the quantity of light shining upon the two tubes, the variation in intensity of the light source has no effect on the deflections of the instrument. Furthermore since I use photo-electric tubes of the saturated type a variation in voltage does not affect the current flowing in the photo-electric tubes or their response to differences in the relative amount of light received by the two photo-electric tubes.

In order to increase almost indefinitely the length of time which my device will continue in operation without attention I operate the filaments of the lamp 61 and the devices 40 and 54 considerably below their rated voltage so as to make the occurrence of burned out filaments very rare.

The relationship of the parts of the optical system may be understood more completely by reference to Fig. 4 which shows a plan view of the paths of the beam of light produced by lamp 61.

Although the relative positions and shapes of certain of the various parts of the optical system may be modified without departing from the spirit of my invention as will be understood by those skilled in the art, I prefer to place the parts substantially as follows:

The axes of the rotatable members of the elements 10 and 11 are preferably made parallel. To facilitate the explanation it is assumed that the mirrors 22 and 28 rotate about the same vertical axis although for clearness of illustration the mirrors are shown in Fig. 4 as being somewhat displaced.

Referring to the angles between the projections of the beams upon a horizontal plane rather than the actual angles between beams, the beam 82 strikes mirror 22 and is reflected as beam 83, which makes an angle with beam 82 equal to twice the angle of deflection of mirror 22 from a normal to beam 82. The beam 83 strikes surface 77 of mirror 76, which is preferably a segment of a sphere, the center of which falls upon the axis of rotation of mirrors 22 and 28 at a point approximately halfway therebetween, but which may be a segment of any surface of revolution such as a cylinder or a toroid having its axis coincident with the axis of rotation of mirrors 22 and 28. Beam 83 will be reflected along a path 84 in the same vertical plane as beam 83. The beam 84 will strike mirror 28 and be reflected as beam 85. Irrespective of the deflections of mirrors 22 and 28, if the mirrors are parallel beam 85 will be in the fixed vertical plane including beam 82.

The mirror 78 is so placed that its surfaces 79 and 80 intersect in a vertical line 81 falling within the plane including beams 82 and 85. Thus when the two deflecting elements are in accord so that the mirrors are parallel the beam 85 will strike the edge 81 of mirror 78 and be equally divided into beams 86 and 87 so that photo-electric tubes 63 and 64 are equally illuminated. However if the mirror 28 deviates a minute angle from the position of agreement with that of element 10 beam 85 will be rotated at an angle equal to twice the deviation of mirror 28 from mirror 10, and consequently beam 85 will strike mirror 78 on one side of the edge 81 so that photo-electric cells 63 and 64 will be unequally illuminated. As previously explained the unbalance of the illumination of photo-electric tubes 63 and 64 will cause tube 54 and armature 27 to act to return the mirrors to a position of parallelism.

Although I believe that the most precise results will be obtained by placing the parts of the optical system in the positions I have assumed in the explanation, it will be understood that slight variations may be made without destroying the accuracy of the response. For example, a slight displacement of the element carrying mirror 22 toward or away from the back 13 of the recorder 12 will vary slightly the full scale deflection of the recorder without perceptibly altering the relative value of the scale divisions in the different portions of the scale.

Furthermore, although I prefer to place the axes of rotation of mirrors 22 and 28 approximately at the secondary focus of mirror 77 which corresponds to its center of curvature, it will be understood that said axes may also be displaced so as to pass through conjugate foci of the mirror 77.

It will be understood that although I have explained the operation of my device using a lamp 61 to produce visible radiations, substantially the same operation will result if a source of invisible radiations is used or if other radiation responsive devices are substituted for the photo-electric tubes 63 and 64. In using the terms of optics and illumination I mean to refer to the use of invisible as well as visible radiations which may be reflected or refracted.

In the recording instrument shown in Fig. 1 I provide a suitable hood 87 to protect the optical system from external light as well as from dust. However the ordinary accumulations of dust upon the reflecting surfaces have almost a negligible effect upon the sensitivity and accuracy of my device.

The operation of the apparatus is such that the rotation of shaft 21 of the sensitive measuring instrument is closely followed by a corresponding rotation of the shaft 26 of the high torque recorder 11. The torque of the recorder may be made many times that of the measuring instrument but the accuracy of the recorder is of the high order obtainable in the sensitive measuring instrument 10.

It will therefore be obvious that my device combines the advantages of highly sensitive indicating elements with high torque elements for operating continuous recorders or other devices. For example, my device may be readily constructed when used as an ammeter or a voltmeter to give full scale deflections, of the order of 20 micro-amperes or 1 milli-volt. Obviously the sensitivity of my device may be further increased by utilizing means well known to the art such as thermionic amplifying implements to extend the range.

It is apparent that my device overcomes disadvantages which have heretofore been found in the use of balanced photo-electric tubes in that although loss of sensitivity is rare, even the complete loss of sensitivity of one of the tubes would result in the deflection of the beam 85 by an amount equal only to its width. For this reason it is not necessary to use tubes with identical characteristics. Furthermore a change in the relative sensitivity of the two photo-electric tubes, although rare, is readily detected by the difference in the speeds of follow-up of the torque producing element in going up and in going down scale.

Furthermore changes in the characteristics of the three-electrode vacuum tube merely mean that photo-electric tube must change the grid potential to a different value in order to give the same plate current but do not affect the accuracy of the device.

It will be obvious that the utilization of my invention opens the field of recording instruments to a wide variety of applications requiring highly sensitive response elements such as devices for recording radio receiver performance, or the receiving recorder of a telemetering system in which the currents are greatly attenuated by reason of long transmission distances. My invention likewise enables the use of recording instruments with sensitive electric gauges for obtaining a continuous record of thicknesses of sheet metal, rubber, paper, etc., or minute distortions of roller or ball-bearings under strain or other devices in which extremely small changes in dimensions take place. My invention also opens the field of the recording instrument to devices for recording noise intensity, illumination, percentages of carbon dioxide, fluctuating temperatures, and to high sensitivity voltage or frequency measurements regardless of whether the fluctuations take place slowly or with great rapidity. Although I have explained the theory of operation of my device in connection with recording instrument it will be understood that my invention is equally applicable to other types of instruments, particularly those requiring the production of a high torque in response to a feeble impulse.

But my invention also includes devices in which variations in a measuring circuit are transformed from one form to another without necessarily changing the strength thereof, or where there is no need for amplifying the torque obtainable, and I have used the term "measuring instrument" to include all types of instruments in which a response is obtained dependent upon the magnitude of a measured quantity. In telemetering, for example, I may extend the lead 53' in order that indicating instruments at distant points may be placed in series with coil 30, and secondary element 11 may become a sensitive relay used in conjunction with the follow-up system and discharge tube 54 to maintain the current in lead 53' at values indicative of the magnitude of the quantity measured by element 10.

Although I have shown an arrangement whereby the deflection of the secondary element 11 is regulated by the magnitude of a current controlled by the deflection of the basic element 10, it will be understood that the regulation of the secondary element 11 in accordance with the deflection of the basic element 10 may also be effected in other ways. For example, in the device shown in part in Fig. 5, the magnitude of the direct current in the plate circuit of tube 54 is used to control the frequency of an alternating current produced by frequency generator 88, forming no part of my invention, which may be of any suitable construction. The device represented by the connection diagram Fig. 5 may be used as a telemeter to transmit indications at a distance, in addition to providing a record. Obviously, if desired, the instrument may be used without the pen 18 and chart assembly 14 for the sole purpose of providing remote indications.

The alternating current is conducted by leads 89 to the terminals of a frequency meter element 90 substituted for the type of secondary element 11 shown in Fig. 2. The frequency meter element carries the mirror 28 on its shaft 26, and the follow-up system and three-electrode tube operate as explained in connection with Fig. 2 to maintain parallelism between mirrors 22 and 28 by suitably varying the output of tube 54, and consequently the frequency of the currents flowing in leads 89. This frequency accordingly provides an indication of magnitude of the quantity measured by element 10, and the indication may be transmitted to a distance over a pair of conductors 91 connected in parallel with frequency meter element 90.

The construction and operation of the parts constituting the remainder of the circuit is similar to that of the embodiment disclosed in Figure 2, with the exception that reactance coils 92 and 93 not forming a part of the secondary element 90 may be used with the resistor to form a filter and voltage divider for the rectified direct current circuit shown in Figure 2.

While I have shown and described the preferred embodiment of my invention, I wish it to be understood that I do not confine myself to the precise details of construction herein set forth by way of illustration as it is apparent that many changes and variations may be made therein by those skilled in the art without departing from the spirit of the invention or exceeding the scope of the appended claims.

What I claim as new and desire to secure by Letters Patent of the United States, is:

1. In a measuring instrument a basic deflecting element responsive to a quantity to be measured, a secondary element reproducing the deflections of said basic element without placing a load thereon, an auxiliary source of power energizing said secondary element, a thermionic discharge device controlling the energization of said secondary element to govern the magnitude of the deflection thereof, said discharge device including a grid, the potential of which regulates said discharge device, and a light sensitive electrical follow-up device comprising means to vary the potential of said grid in response to lack of agreement between the deflections of said basic and secondary elements to bring the deflections of the latter in accord with those of the former.

2. In a measuring instrument a basic element having a deflecting member responsive to a quantity to be measured, a secondary element having a member deflecting in accordance with the deflections of said basic element without placing a load thereon, an auxiliary source of power energizing said secondary element, a thermionic discharge device controlling the energization of said secondary element to govern the magnitude of the deflection thereof, said discharge device including a grid the potential of which regulates said discharge device, a pair of photo-electric tubes connected in series carrying a current supplied by said auxiliary source of power and having their common terminal connected to the grid of said discharge device, and a follow-up device comprising mirrors carried by the deflecting members of said basic and secondary elements, means for causing a beam of radiant energy to strike the mirror carried by said basic element, means for causing the beam reflected from said mirror to strike the mirror carried by the secondary element at an angle dependent upon the deflection of said basic element, and means for causing the light reflected from the mirror carried by said secondary element to divide and fall upon said photo-electric tubes, said division being unequal when the deflections of said basic and secondary elements are not in accord thereby causing the currents flowing in said photo-electric tubes to be unequal thereby changing the grid potential sufficiently and in the proper direction to cause said energizing means to bring the secondary element in accordance with the basic element.

3. In combination with an auxiliary source of alternating current, a recording instrument comprising a controlling element having a movable member responsive to the magnitude of the quantity to be recorded, a recording element having a movable coil and a stationary field coil, means for rectifying said alternating current to produce a source of direct current, means serving both as a voltage divider and a filter for said rectified current comprising said field coil and a resistor in series, a three-electrode discharge device connected as a valve between said source of direct current and the movable coil of said recording element and having a grid the potential of which controls the power released by said discharge device, a pair of photo-electric tubes connected in series with their common terminal connected to the grid of said discharge device and carrying current supplied by said source of direct current, a source of light and a system of mirrors for causing said photo-electric tubes to be unequally illuminated whenever the moving coil of said recording element departs from a position of agreement with the deflection of the controlling element so as to unbalance the currents flowing in said photo-electric tubes and change the potential of the grid of said discharge device until the current in the moving coil of said recording element has been changed sufficiently to bring the deflection of the recording element in accord with that of the controlling element and balance the circuit.

4. In a measuring instrument having controlling and torque producing elements with deflecting members, a follow-up system comprising means for energizing said torque producing element, means for producing a beam of radiant energy, a system of mirrors for reflecting said beam, a pair of photo-electric tubes, means for varying the deflection of said torque producing element by changing the energization thereof in accordance with an unbalance in the relative illumination of said photo-electric tubes, said system of mirrors including mirrors carried by said deflecting members, a concave mirror so shaped and placed in relation thereto that said beam will travel from the source to one of said movable mirrors, thence to said concave mirror, thence to the other of said movable mirrors and will leave the latter along a fixed path only when the movable mirrors are parallel, and a mirror having a pair of reflecting surfaces intersecting in a line intersecting said fixed path so as to split the beam and equally illuminate said pair of photo-electric tubes when said movable mirrors are parallel but unbalance the illumination of said photo-electric tubes when said movable mirrors deviate from parallelism, thereby changing the energization of said torque producing element and restoring said movable members to parallelism.

5. In a measuring instrument having controlling and torque producing elements with deflecting members rotable about parallel axes, a follow-up system comprising means for energizing said torque producing element, means for producing a beam of radiant energy, a system of mirrors for reflecting said beam, a pair of photo-electric tubes, means for varying the deflection of said torque producing element by changing the energization thereof in accordance with an unbalance in the relative illumination of said photo-electric tubes, said system of mirrors including mirrors carried by said deflecting members, one of which rotatably deflecting members, one of which mirrors is placed to reflect said beam of radiant energy, a concave mirror receiving said reflected beam and reflecting it to the other of said deflecting mirrors from which it is reflected along a path which is fixed when said deflecting mirrors are parallel said concave mirror having a surface forming substantially a segment of a surface of revolution having its axis parallel to the axes of rotation of said deflecting mirrors and having conjugate foci lying substantially within said axes, and a mirror having a pair of reflecting surfaces intersecting in a line which intersects said fixed path of the beam reflected by the second of said rotating mirrors so as to split the beam and equally illuminate said pair of photo-electric tubes when said deflecting mirrors are parallel but to unbalance the illumination of said photo-electric tubes when said deflecting mirrors deviate from parallelism, thereby changing the energization of said torque producing element and restoring said deflecting mirrors to parallelism.

6. In a measuring instrument having controlling and torque producing elements with deflecting members, an optical follow-up system in combination with an auxiliary source of current for maintaining the deflection of said torque producing element in agreement with that of the controlling element said follow-up system comprising a pair of photo-electric tubes of the saturated type, in which the current varies with illumination but is substantially independent of voltage, connected in series and carrying a current supplied by said auxiliary source, means for causing said tubes to be equally illuminated when said deflecting elements are in agreement and unequally illuminated when said elements are not in agreement, and a three-electrode discharge device for regulating the energization of said torque producing element and having a grid and a cathode with a condenser interposed therebetween, said grid being connected to the common terminal of said photo-electric tubes so that unequal illumination of said photo-electric tubes unbalances the current therein, causing a flow of current between their common terminal and said condenser so as to change the charge of said condenser and the potential of said grid until said discharge device has sufficiently altered the energization of said torque producing element to bring its deflection in accord with that of the controlling element.

7. A recording instrument comprising a casing, a high torque electric meter in the upper back portion of said casing, a chart carriage in the front portion of said casing carrying a chart, a pen moved over said chart by said high torque meter in accordance with its deflection, a highly sensitive low torque electric measuring instrument in said casing beneath the high torque meter, and a light sensitive follow-up system between the meter and instrument within said casing back of said chart carriage for causing the high torque meter to follow the movement of the highly sensitive low torque instrument without imposing load on the latter.

8. A recording instrument comprising a high torque recording electric meter and a high sensitivity low torque measuring instrument having movable shafts in axial alignment, a grid controlled vacuum tube for controlling the energization of the high torque meter, a pair of normally balanced photo-electric cells for controlling the grid potential of said tube, and a light ray reflecting system including mirrors on the adjacent ends of said shafts for controlling the photo-electric cells, said apparatus comprising a follow-up system between the measuring instrument and recording meter by means of which the latter is caused to reproduce the movement of the measuring instrument without imposing load thereon.

9. A recording instrument comprising a casing containing a high torque electric meter in the upper back portion of said casing, a high sensitivity measuring instrument beneath said high torque meter, said instrument and meter having movable shafts in axial alignment, mirrors on the adjacent ends of said shafts, a chart carriage in said casing in front of said instrument and meter, a chart carried thereby, a pen moved over said chart by the high torque meter, and a light sensitive electrical follow-up system including the mirrors on the two shafts located back of said chart carriage for controlling the operation of the high torque meter in accordance with the movement of the measuring instrument without imposing load on the latter.

10. A recording element comprising a casing containing a high torque meter element in the upper back portion of said casing, a highly sensitive measuring instrument below said high torque element, a light sensitive electrical follow-up system placed between said high torque element and said measuring instrument for causing said high torque element to follow the deflections of said measuring instrument without placing a mechanical load thereon, a chart carriage in said casing in front of said high torque element and said instrument, a chart carried thereby, a pen moved over said chart by the high torque element in accordance with the movements of the measuring instrument, a transformer in the lower back portion of said casing for supplying auxiliary power to the devices contained in said casing, a rectifying tube and a three-electrode discharge tube in the lower front portion of said casing, said discharge tube controlling said high torque element, and said rectifying tube supplying direct current to said discharge tube and said optical follow-up system.

11. In combination with a signal transmitting line, a telemetering instrument comprising a basic deflecting element responsive to a quantity to be measured, a frequency meter element reproducing the deflection of said basic element without placing a load thereon, an auxiliary source of alternating current power of variable frequency energizing said frequency meter element and said signal transmitting line, a thermionic discharge device controlling the frequency of said auxiliary source to govern the magnitude of the deflection of said frequency meter element, said discharge device including a grid, the potential of which regulates said discharge device, and a light sensitive electrical follow-up system between the basic element and frequency meter element comprising means to vary the potential of said grid in response to lack of agreement between the deflection of said basic and frequency meter elements to bring the deflection of the latter in accord with those of the former.

In witness whereof I have hereunto set my hand.

CRAMER W. LA PIERRE.